(12) United States Patent
Watanabe

(10) Patent No.: US 11,965,635 B2
(45) Date of Patent: Apr. 23, 2024

(54) VEHICULAR LIGHT GUIDE MEMBER, AND VEHICLE LAMP FITTING

(71) Applicant: ICHIKOH INDUSTRIES, LTD., Isehara (JP)

(72) Inventor: Ayumi Watanabe, Isehara (JP)

(73) Assignee: ICHIKOH INDUSTRIES, LTD., Isehara (JP)

( * ) Notice: Subject to any disclaimer, the term of this patent is extended or adjusted under 35 U.S.C. 154(b) by 0 days.

(21) Appl. No.: 18/040,118

(22) PCT Filed: Jul. 29, 2021

(86) PCT No.: PCT/JP2021/028095
§ 371 (c)(1),
(2) Date: Jan. 31, 2023

(87) PCT Pub. No.: WO2022/025181
PCT Pub. Date: Feb. 3, 2022

(65) Prior Publication Data
US 2023/0288041 A1    Sep. 14, 2023

(30) Foreign Application Priority Data
Jul. 31, 2020 (JP) .................................. 2020-130195

(51) Int. Cl.
*F21S 43/245* (2018.01)
*B60Q 1/38* (2006.01)
(Continued)

(52) U.S. Cl.
CPC ............ *F21S 43/245* (2018.01); *B60Q 1/381* (2022.05); *F21S 43/237* (2018.01); *F21S 43/249* (2018.01); *F21S 43/33* (2018.01); *F21W 2103/20* (2018.01)

(58) Field of Classification Search
CPC ...... F21S 43/245; F21S 43/237; F21S 43/249; F21S 43/33; B60Q 1/381; F21W 2103/20
See application file for complete search history.

(56) References Cited

U.S. PATENT DOCUMENTS 5,184,883 A * 2/1993 Finch ................... G02B 6/0008
362/512
9,862,301 B2 * 1/2018 Yamada ................. B60Q 1/302
(Continued)

FOREIGN PATENT DOCUMENTS

| JP | 2008-192354 A |   | 8/2008 |
|----|---------------|---|--------|
| JP | 2008192354 A  | * | 8/2008 |
| JP | 2019-36529 A  |   | 3/2019 |

OTHER PUBLICATIONS

English translation of Ishikawa JP-2008192354-A, published Aug. 2008 (Year: 2008).*

(Continued)

*Primary Examiner* — Evan P Dzierzynski
(74) *Attorney, Agent, or Firm* — Oblon, McClelland, Maier & Neustadt, L.L.P.

(57) ABSTRACT

A vehicular light guide member includes a main body part and a light entrance part. The main body part has an exit surface and a plurality of specular surfaces facing the exit surface. Some of the specular surfaces constitute a displaced section that is closer to or farther from the exit surface than a reference section constituted of the remains of the specular surfaces. The specular surfaces as such allow light to be uniformly emitted through the exit surface.

7 Claims, 12 Drawing Sheets

(51) Int. Cl.
*F21S 43/237* (2018.01)
*F21S 43/249* (2018.01)
*F21S 43/33* (2018.01)
*F21W 103/20* (2018.01)

(56) References Cited

U.S. PATENT DOCUMENTS

| | | | | |
|---|---|---|---|---|
| 2013/0314935 A1* | 11/2013 | Tokieda | ............... | B60Q 1/0035 |
| | | | | 362/511 |
| 2015/0078025 A1* | 3/2015 | Kleiner | ................. | F21S 43/251 |
| | | | | 362/511 |
| 2017/0276315 A1* | 9/2017 | Kawabata | ............. | F21S 43/239 |
| 2018/0245763 A1* | 8/2018 | Oshima | .................... | B60Q 1/34 |
| 2019/0128492 A1* | 5/2019 | Gloss | .................... | F21S 43/237 |
| 2019/0285241 A1* | 9/2019 | Ikuta | .................... | B60Q 1/0052 |
| 2019/0389364 A1* | 12/2019 | Shah | .................... | F21S 43/315 |

OTHER PUBLICATIONS

International Search Report dated Sep. 14, 2021 in PCT/JP2021/028095 filed Jul. 29, 2021, 2 pages.
Japanese Notice of Reasons for Refusal dated Nov. 14, 2023, in Japanese Patent Application No. 2020-130195, therein, 7 pages (with English Translation).

* cited by examiner (A)

(B)

(C)

(D)

(E)

VEHICULAR LIGHT GUIDE MEMBER, AND VEHICLE LAMP FITTING

TECHNICAL FIELD

The present invention relates to a vehicular light guide member. The present invention also relates to a vehicle lamp fitting including the vehicular light guide member.

BACKGROUND ART

A vehicular light guide member and a vehicle lamp fitting including the vehicular light guide member are disclosed in PTL 1, for instance. PTL 1 is described below.

A rod-shaped light guide body in PTL 1 has a light exit surface at part of a peripheral face and a light incidence surface at one end face, and includes a branched part. The branched part has a light incidence surface. Opposite to the light incidence surface at one end face and the light incidence surface of the branched part, light sources are arranged, respectively.

In the rod-shaped light guide body in PTL 1, light from a light source is incident on the light incidence surface at one end face and the incident light is guided in the inside, while light from a light source is incident on the light incidence surface of the branched part and the incident light joins the inside and is guided in the inside so as to emit internal light through the light exit surface.

The vehicle lamp fitting in PTL 1 includes a lamp body and an outer cover that form a lamp chamber, and a light source and the rod-shaped light guide body in PTL 1 that are arranged in the lamp chamber.

In the vehicle lamp fitting in PTL 1, light emitted through the light exit surface of the rod-shaped light guide body is emitted ahead of the lamp fitting through the outer cover.

In the rod-shaped light guide body in PTL 1 and the vehicle lamp fitting in PTL 1 as above, it is important that the light exit surface of the rod-shaped light guide body and the outer cover of the vehicle lamp fitting uniformly radiate.

In other words, it is undesirable in terms of attractiveness that, in the light exit surface of the rod-shaped light guide body and the outer cover of the vehicle lamp fitting, a dark portion (dim portion) or a light portion (bright portion) is generated, leading to a sharp contrast between lightness and darkness and a considerable unevenness (nonuniformity) in brightness.

CITATION LIST

Patent Literature

PTL 1: JP 2019-36529 A

SUMMARY OF THE INVENTION

Problems to be Solved by the Invention

In the rod-shaped light guide body in PTL 1 and the vehicle lamp fitting in PTL 1, however, a dark portion may be generated on a downstream side in a light guiding direction (direction where light is guided) of the branched part. The cause of generation of a dark portion will be explained later.

The problem to be solved by the present invention lies in providing a vehicular light guide member and a vehicle lamp fitting that allow an exit surface of the vehicular light guide member and a lamp lens of the vehicle lamp fitting to uniformly radiate.

Means for Solving the Problem

A vehicular light guide member of the present invention is a vehicular light guide member to guide light in one direction by a light guiding operation that includes: a main body part; and at least one light entrance part provided on a side face of the main body part to cause the light to join the main body part, the main body part having: an exit surface provided at a side face opposite to the side face where the light entrance part is provided, and allowing part of internal light to be emitted outside as emitted light; and a plurality of specular surfaces provided at the side face where the light entrance part is provided, facing the exit surface, and reflecting the internal light toward the exit surface as reflected light, and some of the plurality of specular surfaces constitute a displaced section so formed as to be displaced to a position closer to the exit surface or a position farther from the exit surface with respect to a reference section constituted of remains of the plurality of specular surfaces.

In the vehicular light guide member of the present invention, it is preferable that the specular surfaces of the displaced section increase or decrease the reflected light as compared with the reflected light from the specular surfaces in a state before being displaced.

In the vehicular light guide member of the present invention, it is preferable that the displaced section is provided on a downstream side in a light guiding direction of the light entrance part, and the specular surfaces of the displaced section are displaced to positions closer to the exit surface, increase the reflected light as compared with the reflected light from the specular surfaces in a state before being displaced, and direct the reflected light toward a portion with a small luminance value of the exit surface.

In the vehicular light guide member of the present invention, it is preferable that the displaced section has a form of displacement that gradually changes so that displacement is increased from an upstream side toward a downstream side in a light guiding direction or gradually changes so that displacement is great on a midstream side in the light guiding direction and is reduced toward the upstream side in the light guiding direction and toward the downstream side in the light guiding direction.

A vehicle lamp fitting of the present invention includes: a lamp housing and a lamp lens that demarcate a lamp chamber; and a light source and the vehicular light guide member of the present invention that are arranged in the lamp chamber, the light source is arranged at least for the light entrance part of the vehicular light guide member, and the exit surface of the vehicular light guide member faces the lamp lens.

In the vehicle lamp fitting of the present invention, it is preferable that the light entrance part includes a plurality of light entrance parts, the light source includes light sources that are arranged for the plurality of light entrance parts, respectively, and the light sources are connected to a controller performing sequence control of turning on and off of the light sources.

Effect of the Invention

The vehicular light guide member and the vehicle lamp fitting of the present invention allow the exit surface of the vehicular light guide member and the lamp lens of the vehicle lamp fitting to uniformly radiate.

BRIEF DESCRIPTION OF THE DRAWINGS

FIG. 1 is a front view (view from a front side toward a rear side of a vehicle) illustrating an embodiment of a vehicular light guide member and a vehicle lamp fitting according to the present invention in a state of not being on.

FIG. 2 is a front view illustrating a state where five light sources are all on.

FIG. 3 is a frontal diagram of a lamp lens, illustrating a state where the five light sources are on or off according to sequence control by a controller. (A) is a frontal diagram of the lamp lens, illustrating a state where one light source is on. (B) is a frontal diagram of the lamp lens, illustrating a state where two light sources are on. (C) is a frontal diagram of the lamp lens, illustrating a state where three light sources are on. (D) is a frontal diagram of the lamp lens, illustrating a state where four light sources are on. (E) is a frontal diagram of the lamp lens, illustrating a state where the five light sources are all on.

MODE FOR CARRYING OUT THE INVENTION

In the following, an exemplary embodiment (working example) of a vehicular light guide member and a vehicle lamp fitting according to the present invention is described in detail based on the drawings.

In this specification, front, rear, up, down, left, and right refer to front, rear, up, down, left, and right defined when the vehicular light guide member and the vehicle lamp fitting according to the present invention are installed in a vehicle (not illustrated), respectively.

Figure 2:
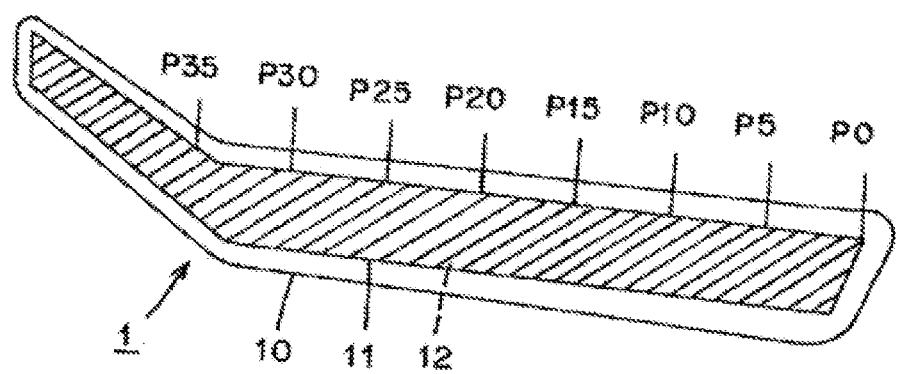
Figure 3:
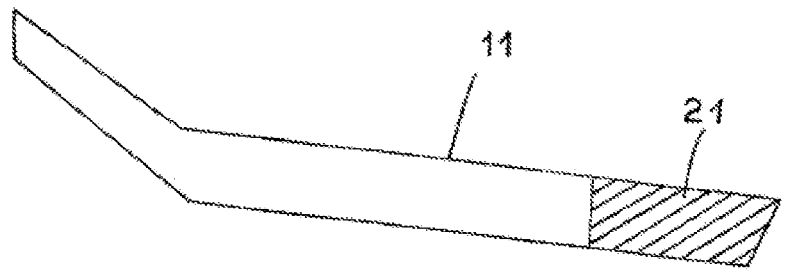
Figure 3:
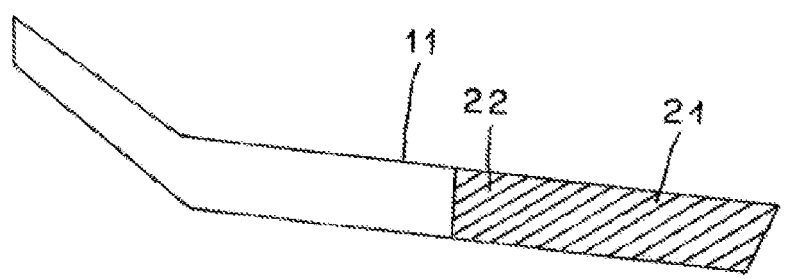
Figure 3:
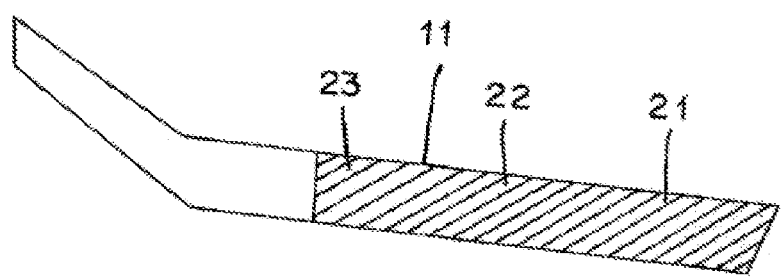
Figure 3:
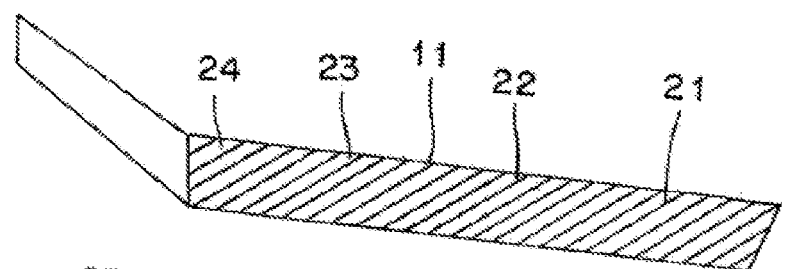
Figure 3:
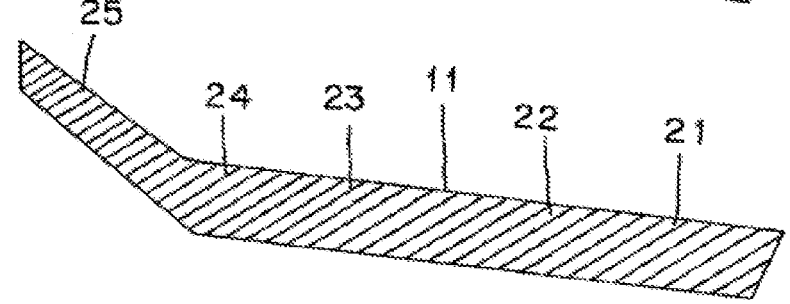

The drawings are schematic diagrams illustrating the vehicular light guide member and the vehicle lamp fitting according to the present invention, so that the details of the vehicular light guide member and the vehicle lamp fitting according to the present invention are omitted in the drawings. In FIGS. 4 through 7, specular surfaces and linkage surfaces are not illustrated. In cross-sectional views, hatching is omitted. In FIGS. 2 and 3, hatched portions represent radiating portions of a lamp lens.

Description on Configuration of Embodiment

Configurations of a vehicular light guide member and a vehicle lamp fitting according to the present embodiment are described below.

(Description on Vehicle Lamp Fitting 1) In FIGS. 1, 2, and 4, a reference sign "1" is given to the vehicle lamp fitting according to the present embodiment (hereinafter referred to as "vehicle lamp fitting"). A vehicle lamp fitting 1 of this example is a front turn signal lamp that is mounted on both the left and the right of a front portion of a vehicle. On the periphery of the vehicle lamp fitting 1, a headlamp, a daytime running lamp, and the like are adjacently arranged.

The following description is made on the vehicle lamp fitting 1, which is mounted on the right of the front portion of the vehicle. A vehicle lamp fitting to be mounted on the left of the front portion of the vehicle is bilaterally symmetrical to and substantially the same in configuration as the vehicle lamp fitting 1, which is mounted on the right of the front portion of the vehicle, and is accordingly not described. In FIGS. 1 through 10 and 12, the right in the drawing plane corresponds to an interior side of the vehicle, and the left in the drawing plane corresponds to an exterior side of the vehicle.

The vehicle lamp fitting 1 includes a lamp housing 10, a lamp lens 11, multiple, five in this example, light sources 21, 22, 23, 24, and 25 (hereinafter given as "21 through 25"), and the vehicular light guide member according to the present embodiment (hereinafter referred to as "vehicular light guide member"), namely, a vehicular light guide member 3.

The lamp housing 10 is constituted of a nontransparent member (such as a resin member). The lamp lens 11 is constituted of a transparent member (such as a resin member). The color of light emitted through the lamp lens 11 is yellow or amber. Consequently, the lamp lens 11 is yellow or the like in color if the color of lights from the light sources 21 through 25 is white. If the color of the lights from the light sources 21 through 25 is yellow or the like, the lamp lens 11 does not need to be yellow in color but may be colorless and transparent. An outer design face of the lamp lens 11 extends along a design face extending from the front portion to a lateral portion of the vehicle.

The lamp housing 10 and the lamp lens 11 form a lamp chamber 12. As illustrated in FIG. 4, the five light sources 21 through 25 and the vehicular light guide member (light guide, light guide body or light guide rod) 3 are arranged in the lamp chamber 12. The five light sources 21 through 25, namely, a first light source 21, a second light source 22, a third light source 23, a fourth light source 24, and a fifth light source 25 are arranged from the interior side of the vehicle (the right in FIG. 4) to the exterior side of the vehicle (the left in FIG. 4).

The five light sources 21 through 25 and the vehicular light guide member 3 are fitted to the lamp housing 10 through a fitting member such as a bracket. Although not illustrated, an inner panel (inner housing), an inner lens, and the like are arranged in the lamp chamber 12.

The five light sources 21 through 25 are connected to a power source (battery) through a switch and a controller. The controller performs sequence control of turning on and off of the five light sources 21 through 25. Consequently, the lamp lens 11 radiates smoothly from the interior side of the vehicle (the right in FIG. 3) toward the exterior side of the vehicle (the left in FIG. 3), as illustrated in FIGS. 3(A), (B), (C), (D), and (E). The sequence control is described below.

If the switch is turned on, the first light source 21 is initially turned on (see FIG. 3(A)). Then, the second light source 22 is turned on (see FIG. 3(B)). At this time, the first light source 21 is still on. Next, the third light source 23 is turned on (see FIG. 3(C)). At this time, the first light source 21 and the second light source 22 are still on. Then, the fourth light source 24 is turned on (see FIG. 3(D)). At this time, the first light source 21, the second light source 22, and the third light source 23 are still on. Finally, the fifth light source 25 is turned on (see FIGS. 2 and 3(E)). At this time, the five light sources 21 through 25 are all on. After the state, in which the five light sources 21 through 25 are all on, has continued for a specified period of time, the five light sources 21 through 25 are all turned off (see FIG. 1). With such turning on and off being assumed as one cycle (one period), the cycle is thereafter repeated until the switch is turned off.

(Description on Vehicular Light Guide Member 3) In this example, the vehicular light guide member (hereinafter referred to as "light guide member") 3 is made of a colorless and transparent resin material, such as an acrylic resin, a PC (polycarbonate), and a PMMA (poly(methyl methacrylate), a methacrylic resin).

As illustrated in FIGS. 4 through 7, the light guide member 3 includes a main body part 30 and at least one light entrance part, namely, four (four elongated) light entrance parts 31, 32, 33, and 34 (hereinafter given as "31 through 34") in this example.

Figure 4:
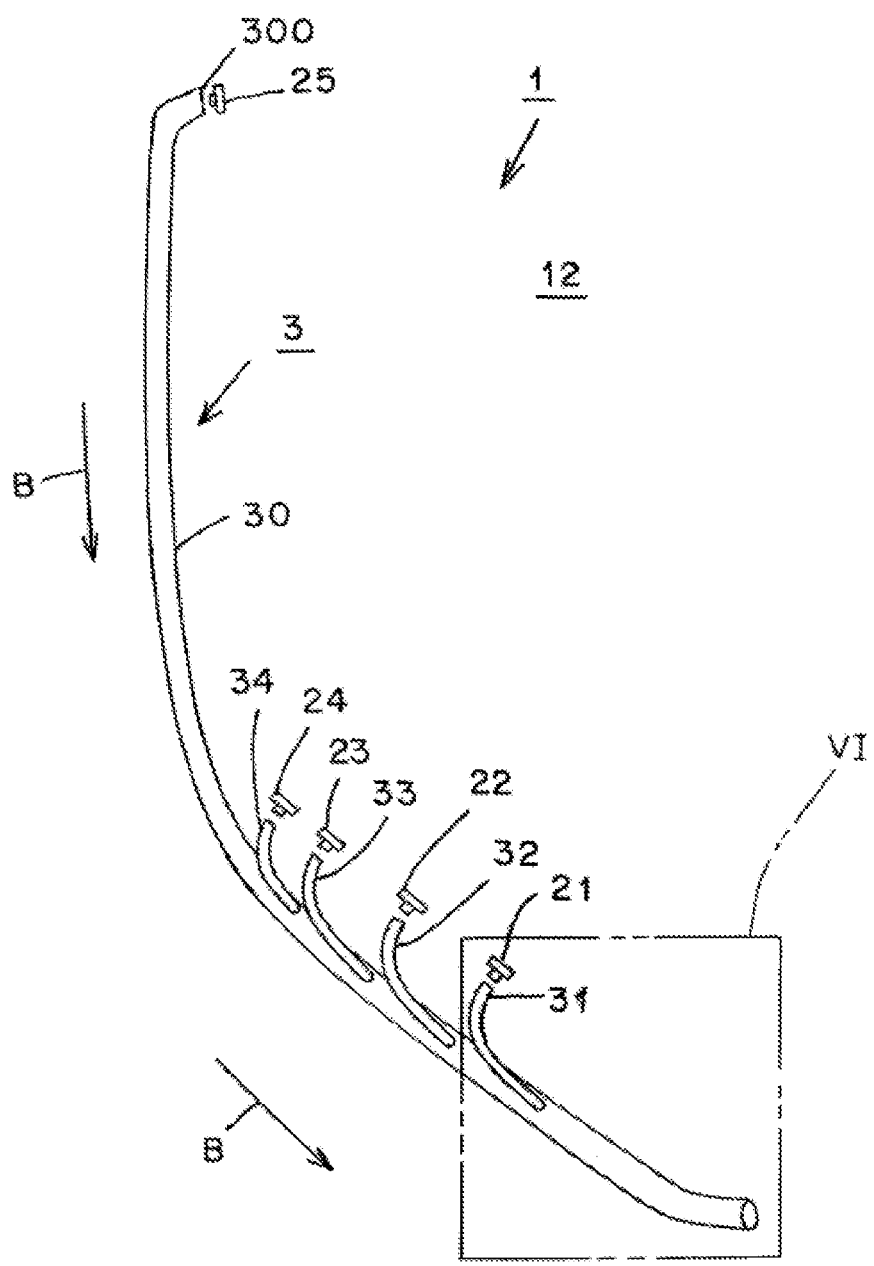
FIG. 4 is a plan view illustrating the five light sources and the vehicular light guide member (plan view of the vehicle lamp fitting, from which a lamp housing and the lamp lens have been removed, as viewed in a direction indicated with an arrow IV in FIG. 1).
Figure 5:
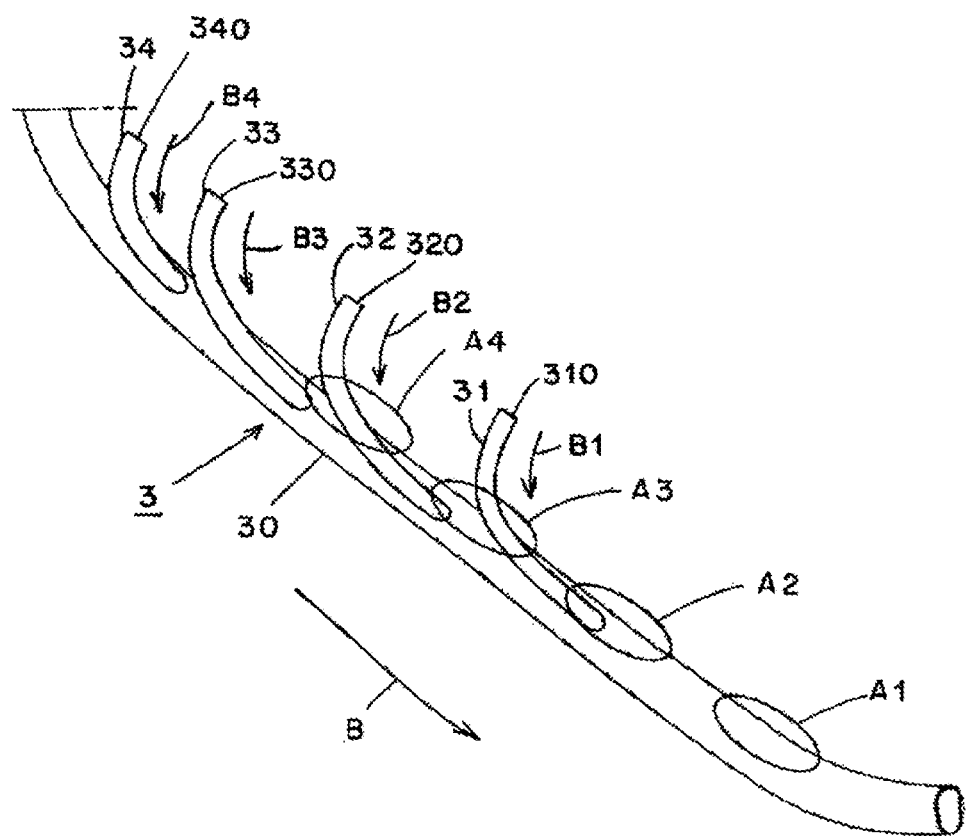
FIG. 5 is a partial, enlarged plan view of the vehicular light guide member, illustrating, by optical path analysis, areas where dark portions (dim portions) are generated.

(Description on Light Entrance Parts 31 Through 34)
The four light entrance parts 31 through 34, namely, a first light entrance part 31, a second light entrance part 32, a third light entrance part 33, and a fourth light entrance part 34 are arranged from the interior side of the vehicle (the right in FIGS. 4 and 5) to the exterior side of the vehicle (the left in FIGS. 4 and 5).

The four light entrance parts 31 through 34 are each in the shape of a round bar with a circular cross section. The four light entrance parts 31 through 34 are equal to one another in diameter. The four light entrance parts 31 through 34 are each curved from one end to the other end in planar view (as viewed from above).

At faces at one end of the four light entrance parts 31 through 34, incidence surfaces 310, 320, 330, and 340 (hereinafter given as "310 through 340") are provided, respectively. The first light source 21, the second light source 22, the third light source 23, and the fourth light source 24 are so arranged as to face the incidence surfaces 310 through 340, respectively. Portions at the other end of the four light entrance parts 31 through 34 are each integrally coupled to a side face of the main body part 30.

The four light entrance parts 31 through 34 allow lights from the four light sources 21 through 24 to enter inside through the incidence surfaces 310 through 340, and cause lights L1 as allowed to enter (see solid-lined arrows in FIGS. 6 and 7) to join the inside of the main body part 30. In other words, the four light entrance parts 31 through 34 guide (advance), by a light guiding operation (total-reflective operation), the lights L1 entering through the incidence surfaces 310 through 340 toward the main body part 30 in solid-lined arrow directions (incidence and join directions) B1, B2, B3, and B4 (hereinafter given as "B1 through B4"). The incidence and join directions B1 through B4 are directions where the lights L1 from the light sources 21 through 24, which have entered in the light entrance parts 31 through 34 through the incidence surfaces 310 through 340, are caused to come from the inside of the light entrance parts 31 through 34 to join the inside of the main body part 30.

(Description on Main Body Part 30)
Similarly to the four light entrance parts 31 through 34, the main body part 30 is in the shape of a round bar with a circular cross section. The main body part 30 is larger in diameter than the four light entrance parts 31 through 34. As illustrated in FIG. 4, the main body part 30 is curved from one end to the other end along the outer design face of the lamp lens 11 and the design face extending from the front portion to the lateral portion of the vehicle in planar view (as viewed from above).

One end of the main body part 30 is located on the exterior side of the vehicle (the left in FIG. 4) and on a rear side of the vehicle as well. The other end of the main body part 30 is located on the interior side of the vehicle (the right in FIG. 4) and on a front side of the vehicle as well. At one end face of the main body part 30, an incidence surface 300 is provided. The fifth light source 25 is so arranged as to face the incidence surface 300.

The main body part 30 allows light from the fifth light source 25 to enter inside through the incidence surface 300 and guides (advances), by the light guiding operation (total-reflective operation), the entering light from one end toward the other end of the main body part 30 in a solid-lined arrow direction (light guiding direction) B, along with the lights L1 having come from the four light entrance parts 31 through 34 and joined. The light guiding direction B is a direction where internal light L1 (the light entering through the incidence surface 300 and the lights L1 having come from the four light entrance parts 31 through 34 and joined) is guided in the inside of the main body part 30.

(Description on Exit Surface 40, Specular Surfaces 41, and Linkage Surfaces 42)
The main body part 30 has an exit surface 40, multiple specular surfaces 41, and multiple linkage surfaces 42.

Figure 6:
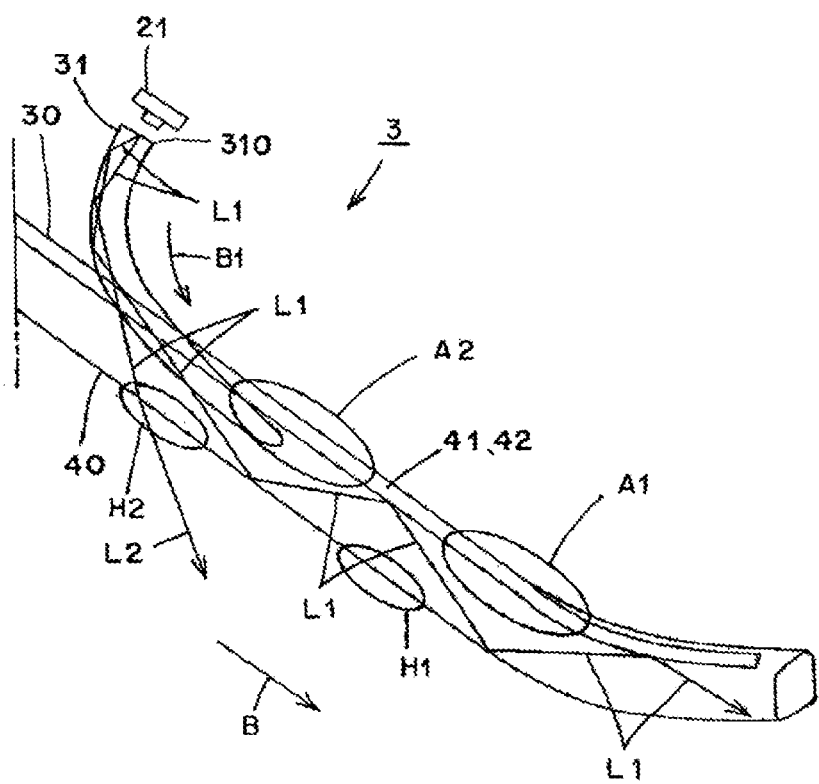
FIG. 6 is a diagram (enlarged view of a portion VI in FIG. 4) illustrating an optical path of light coming from a first light entrance part to join.
Figure 7:
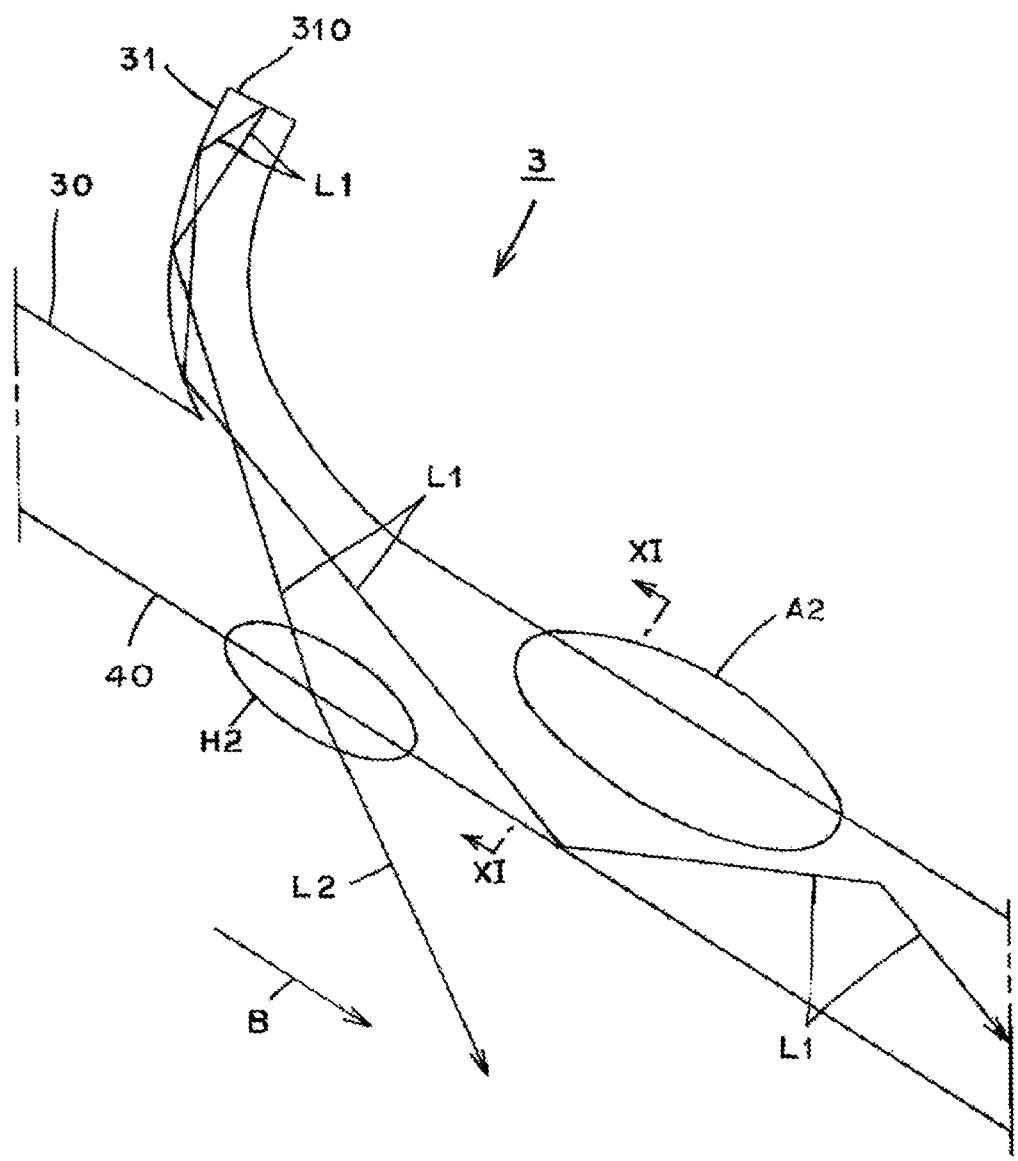
FIG. 7 is an enlarged diagram illustrating a cause of generation of a dark portion.
Figure 10:
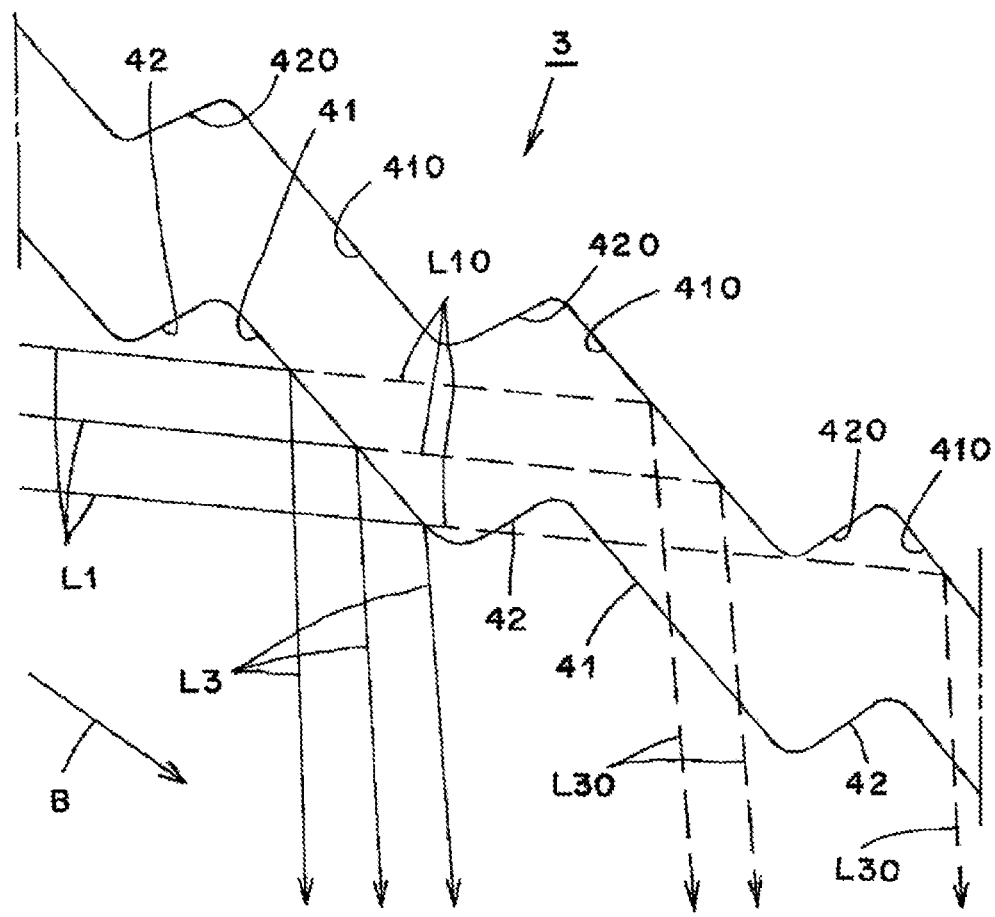
FIG. 10 is an enlarged diagram illustrating an optical path on specular surfaces of the displaced section and an optical path on specular surfaces that the present invention is not embodied in (enlarged diagram of optical paths, illustrating the specular surfaces of the displaced section and the specular surfaces, in which the present invention is not embodied, in a synthetic state).

The exit surface 40 is provided at a side face of the main body part 30 that is opposite to the side face where the four light entrance parts 31 through 34 are provided, that is to say, a side face of the main body part 30 that faces the lamp lens 11 (side face between two two-dot chain lines in FIG. 10). As illustrated in FIGS. 6 and 7, the exit surface 40 allows part of light inside the main body part 30 to be emitted outside as emitted light L2.

The multiple specular surfaces 41 and the multiple linkage surfaces 42 are so provided on the side face of the main body part 30, on which the four light entrance parts 31 through 34 are provided, as to face the exit surface 40. As illustrated in FIGS. 8 through 10 and 12, the multiple specular surfaces 41 and the multiple linkage surfaces 42 are alternately provided in a successive manner. One specular surface 41 and one linkage surface 42 constitute one prism.

As illustrated in FIG. 10, the multiple specular surfaces 41 reflect the light inside the main body part 30 toward the exit surface 40 as reflected light L3. The multiple specular surfaces 41 are tilted with respect to the exit surface 40 and face the exit surface in the light guiding direction B. The multiple linkage surfaces 42 are substantially perpendicular to the exit surface 40 and have a draft of a die.

(Explanation of Cause of Generation of Dark Portion)

The cause of generation of a dark portion is explained below with reference to FIGS. 5 through 7, 10, 11, and 13. In the figures, optical paths of the internal light L1, the emitted light L2, and the reflected light L3 are drawn according to analysis based on computer simulation.

Figure 13:
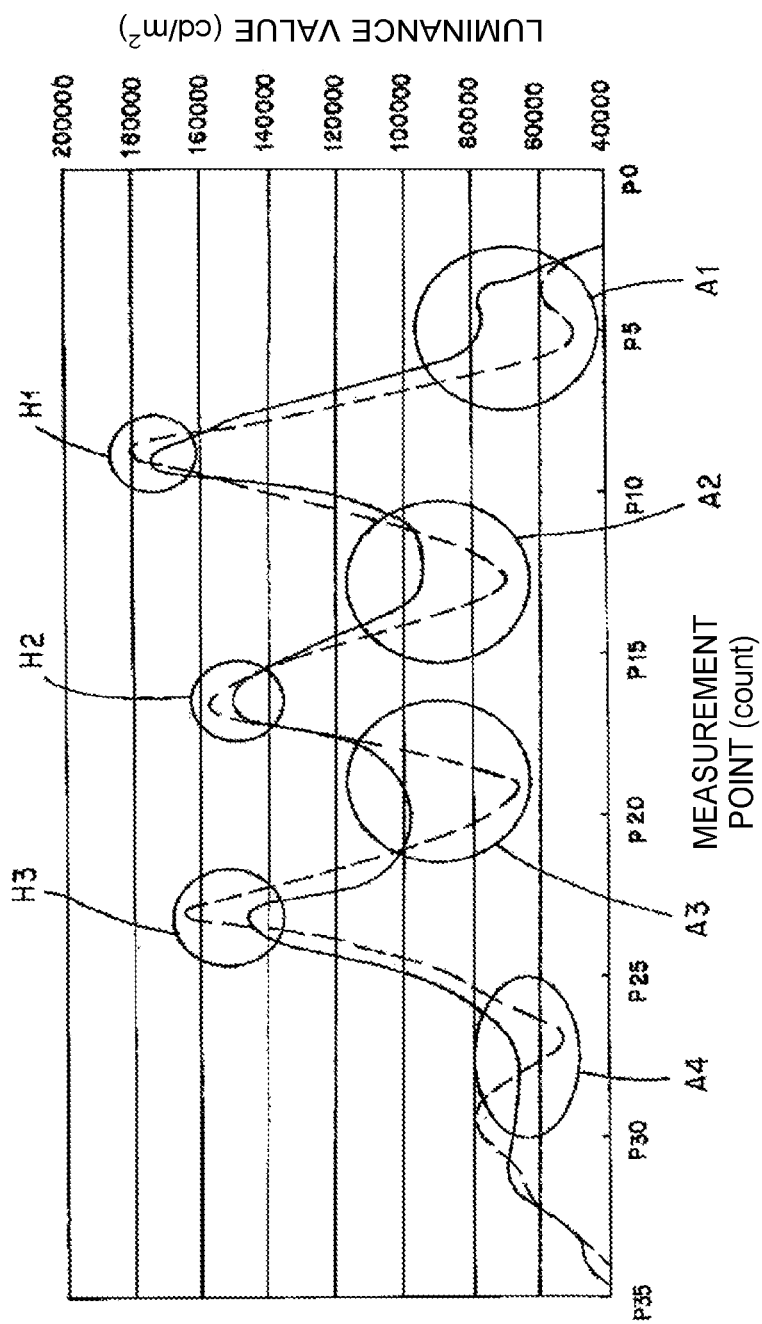
FIG. 13 is a graph (diagram) illustrating luminance values of an exit surface brought about by the specular surfaces of the displaced section and luminance values of the exit surface brought about by the specular surfaces, in which the present invention is not embodied.

FIG. 13 is a graph of luminance values at the exit surface, with a vertical axis indicating luminance values (cd/m2) and a horizontal axis indicating measurement points (count). A solid-lined curve in FIG. 13 represents the luminance at the exit surface 40 of the vehicular light guide member 3. A broken-lined curve in FIG. 13 represents the luminance at an exit surface that the present invention is not embodied in.

Measurement points P0, P5, P10, P15, P20, P25, P30, and P35 (hereinafter given as "P0 through P35") in FIG. 13 correspond to measurement points P0 through P35 on the lamp lens 11 in frontal view illustrated in FIG. 2. The measurement points P5, P10, P15, P20, P25, P30, and P35 indicate positions 5 cm, 10 cm, 15 cm, 20 cm, 25 cm, 30 cm, and 35 cm distant from the measurement point P0 toward the exterior side of the vehicle (the left in FIG. 2), respectively.

The dark portion is represented by valley portions of the solid-lined curve and the broken-lined curve in FIG. 13, and luminance values in a valley portion are small (low) as compared with luminance values in either of portions preceding and succeeding the valley portion. As described above, the dark portion is generated in areas A1, A2, A3, and A4 (hereinafter given as "A1 through A4") on a downstream side in the light guiding direction B of the light entrance parts 31 through 34. As illustrated in FIGS. 5 and 13, the areas A1 through A4, in which the dark portion is generated, are defined as a first dark portion generation area A1, a second dark portion generation area A2, a third dark portion generation area A3, and a fourth dark portion generation area A4 arranged from the interior side of the vehicle (the right in FIGS. 5 and 13) to the exterior side of the vehicle (the left in FIGS. 5 and 13).

In the solid-lined curve and broken-lined curve in FIG. 13, luminance values in a peak portion between valley portions are larger (higher) than luminance values in either valley portion, and such peak portion represents a light portion. The light portion is generated in areas H1, H2, and H3 (hereinafter given as "H1 through H3") between the dark portion generation areas A1 through A4 as illustrated in FIG. 13. As illustrated in FIG. 13, the areas H1 through H3, in which the light portion is generated, are defined as a first light portion generation area H1, a second light portion generation area H2, and a third light portion generation area H3 arranged from the interior side of the vehicle (the right in FIG. 13) to the exterior side of the vehicle (the left in FIG. 13).

The first light portion generation area H1 is located between the first dark portion generation area A1 and the second dark portion generation area A2. The second light portion generation area H2 is located between the second dark portion generation area A2 and the third dark portion generation area A3. The third light portion generation area H3 is located between the third dark portion generation area A3 and the fourth dark portion generation area A4. The dark portion generation areas A1 through A4 and the light portion generation areas H1 through H3 are alternately located.

As illustrated in FIGS. 6 and 7, the lights L1 coming from the inside of the light entrance parts 31 through 34 to join the inside of the main body part 30 are partially guided without striking (coming incident on) the specular surfaces 41 in areas on the downstream side in the light guiding direction B of the light entrance parts 31 through 34 when guided in the inside of the main body part 30 in the light guiding direction B. An area where the internal light L1 does not strike the specular surfaces 41 is dark (has low luminance values) as compared with surrounding areas. As a result, the dark portion is generated in the area where the internal light L1 does not strike the specular surfaces 41.

Thus, the dark portion is generated in the areas on the downstream side in the light guiding direction B of the light entrance parts 31 through 34. The areas on the downstream side in the light guiding direction B of the light entrance parts 31 through 34 constitute the dark portion generation areas A1 through A4.

On the other hand, most of the internal light L1, which does not strike the dark portion generation areas A1 through A4, is subjected to total reflection in portions of the exit surface 40 corresponding to the dark portion generation areas A1 through A4 so as to strike the specular surfaces 41 in areas on the downstream side in the light guiding direction B of the dark portion generation areas A1 through A4, as illustrated in FIGS. 6 and 7. An area where the internal light L1 strikes the specular surfaces 41 is light (has high luminance values) as compared with surrounding areas. As a result, the light portion is generated in the area where the internal light L1 strikes the specular surfaces 41.

As illustrated in FIGS. 6 and 7, the rest of the lights L1 coming from the inside of the light entrance parts 31 through 34 to join the inside of the main body part 30 is emitted outside through the exit surface 40 in areas corresponding to the light entrance parts 31 through 34 as the emitted light L2. An area in the exit surface 40 where the joining lights L1 are emitted as the emitted light L2 is light (has high luminance values) as compared with surrounding areas. As a result, the light portion is generated in the area in the exit surface 40 where the joining lights L1 are emitted as the emitted light L2.

Thus, the light portion is generated in areas between the dark portion generation areas A1 through A4. The areas between the dark portion generation areas A1 through A4 constitute the light portion generation areas H1 through H3.

(Description on Reference Section 43 and Displaced Section 44)

Figure 8:
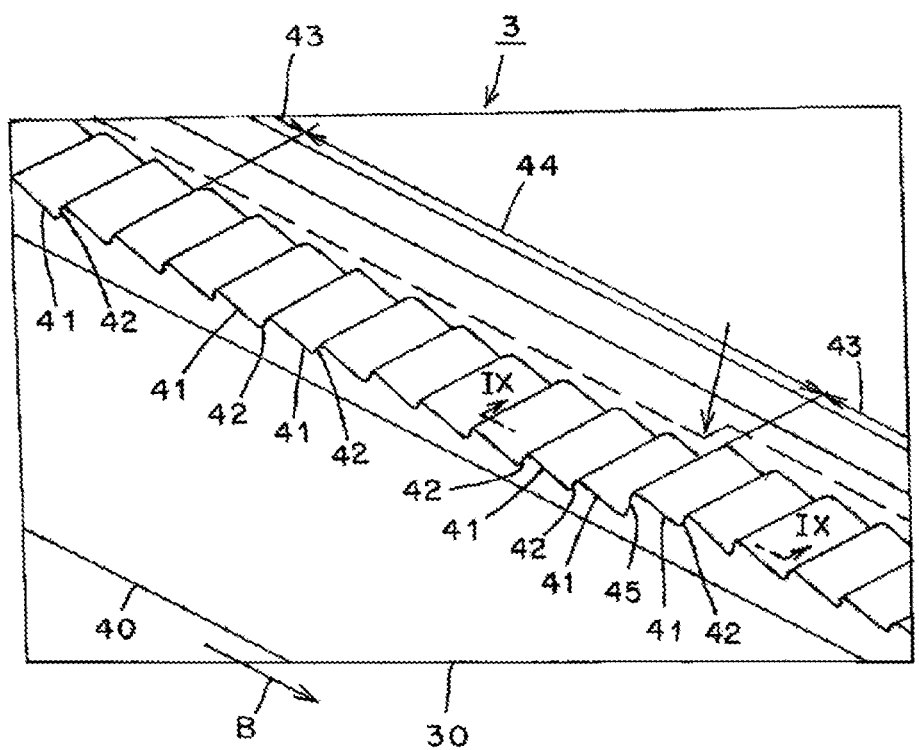
FIG. 8 is an enlarged diagram illustrating a displaced section formed in a second dark portion generation area (partial, enlarged diagram of a second dark portion generation area in FIG. 7).
Figure 9:
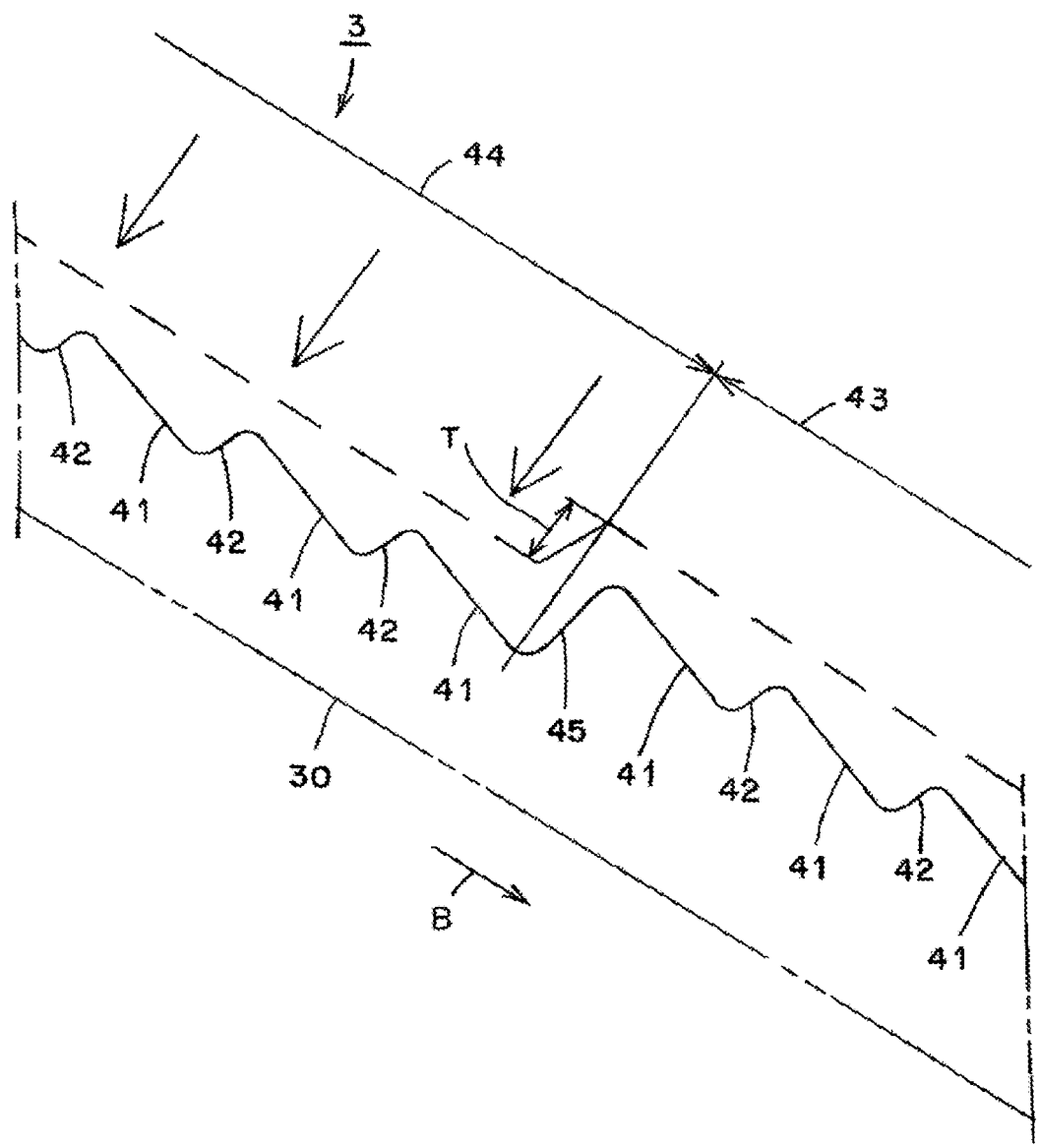
FIG. 9 is an enlarged cross-sectional diagram (enlarged cross-sectional diagram taken along a line IX-IX in FIG. 8) illustrating the displaced section formed in the second dark portion generation area.

As illustrated in FIGS. 8 and 9, some of the multiple specular surfaces 41 constitute a displaced section 44 so formed as to be displaced to a position closer to the exit surface 40 with respect to a reference section 43 constituted of the remains of the multiple specular surfaces 41.

The displaced section 44 is provided in the dark portion generation areas A1 through A4 on the downstream side in the light guiding direction B of the light entrance parts 31 through 34. As illustrated in FIG. 10, the specular surfaces 41 of the displaced section 44 increase the reflected light L3 as compared with reflected light L30 from specular surfaces 410 in a state before being displaced (that is to say, specular surfaces 410 that have not been displaced, or specular surfaces 410 that the present invention is not embodied in) and direct the reflected light as increased toward portions of the exit surface 40 corresponding to the dark portion generation areas A1 through A4.

As illustrated in FIGS. 8 and 9, the form of displacement of the displaced section 44 in the second dark portion generation area A2 gradually changes so that displacement may be increased from an upstream side (an upper left side in FIGS. 8 and 9) toward the downstream side (a lower right side in FIGS. 8 and 9) in the light guiding direction B (see solid-lined arrows in FIGS. 8 and 9).

The number of the specular surfaces 41 of the displaced section 44 in the second dark portion generation area A2 is ten in this example. A size T (height or depth) of a step surface 45 between a downstream side of the displaced section 44 and an upstream side of the reference section 43 is about 1 mm in this example. In the first dark portion generation area A1 and the third dark portion generation area A3, the displaced section 44 has a form of displacement substantially the same as the form of displacement of the displaced section 44 in the second dark portion generation area A2.

Figure 12:
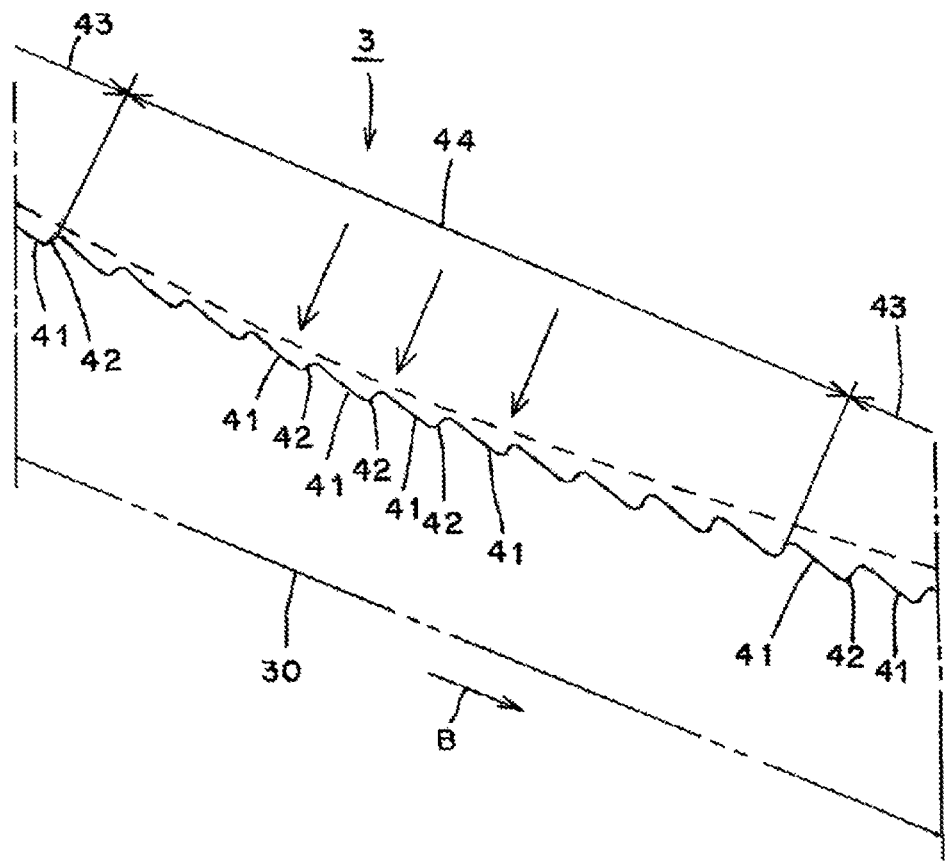
FIG. 12 is an enlarged diagram (enlarged diagram corresponding to FIG. 9) illustrating a displaced section formed in a fourth dark portion generation area.

As illustrated in FIG. 12, the form of displacement of the displaced section 44 in the fourth dark portion generation area A4 gradually changes so that displacement may be great on a midstream side in the light guiding direction B and may be reduced toward the upstream side in the light guiding direction B (an upper left side in FIG. 12) and toward the downstream side in the light guiding direction B (a lower right side in FIG. 12). The number and displacement amount (height or depth) of the specular surfaces 41 of the displaced section 44 in the fourth dark portion generation area A4 conform with the above number and displacement amount of the specular surfaces 41 of the displaced section 44 in the first, second, and third dark portion generation areas A1, A2, and A3.

Description on Operations of Embodiment

The vehicular light guide member 3 and the vehicle lamp fitting 1 according to the present embodiment have the configurations as above, and operations thereof are described below.

If the switch is turned on in the vehicle lamp fitting 1, the first light source 21 is initially turned on and a portion of the lamp lens 11 of the vehicle lamp fitting 1 on the interior side of the vehicle radiates through the vehicular light guide member 3 (see FIG. 3(A)).

Then, the second light source 22 is turned on and a portion of the lamp lens 11 of the vehicle lamp fitting 1 extending from the portion on the interior side of the vehicle to a portion on the exterior side of the vehicle (namely, a portion wider than the portion, which radiates when the first light source 21 is only on) radiates through the vehicular light guide member 3 (see FIG. 3(B)).

Next, the third light source 23 is turned on and a portion of the lamp lens 11 of the vehicle lamp fitting 1 extending from the portion on the interior side of the vehicle to a portion on the exterior side of the vehicle (namely, a portion wider than the portion, which radiates when the first light source 21 and the second light source 22 are on) radiates through the vehicular light guide member 3 (see FIG. 3(C)).

Then, the fourth light source 24 is turned on and a portion of the lamp lens 11 of the vehicle lamp fitting 1 extending from the portion on the interior side of the vehicle to a portion on the exterior side of the vehicle (namely, a portion wider than the portion, which radiates when the first light source 21, the second light source 22, and the third light source 23 are on) radiates through the vehicular light guide member 3 (see FIG. 3(D)).

Finally, the fifth light source 25 is turned on and a nearly entire lamp lens 11 of the vehicle lamp fitting 1 (namely, a portion of the lamp lens wider than the portion, which radiates when the first light source 21, the second light source 22, the third light source 23, and the fourth light source 24 are on) radiates through the vehicular light guide member 3 (see FIGS. 2 and 3(E)).

Figure 1:
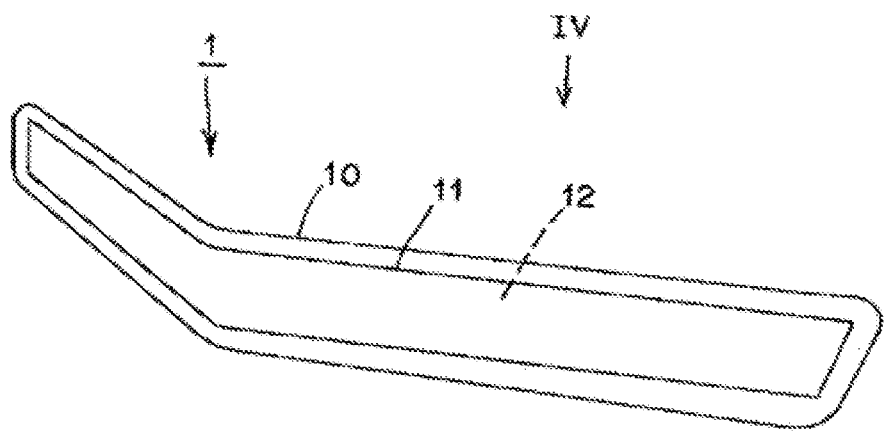

After the state, in which the five light sources 21 through 25 are all on, has continued for a specified period of time, the five light sources 21 through 25 are all turned off (see FIG. 1). With such turning on and off being assumed as one cycle (one period), the cycle is thereafter repeated until the switch is turned off.

In the vehicular light guide member 3, the lights from the first through fourth light sources 21 through 24 enter into the light entrance parts 31 through 34 through the incidence surfaces 310 through 340 of the light entrance parts 31 through 34 and join the inside of the main body part 30. On the other hand, the light from the fifth light source 25 enters into the main body part 30 through the incidence surface 300 of the main body part 30.

Most of the internal light L1 in the main body part 30 is guided by the light guiding operation of the vehicular light guide member 3 in one direction B, reflected by the specular surfaces 41 toward the exit surface 40 as the reflected light L3, and emitted through the exit surface 40 as emitted light. The lights L1 coming from the light entrance parts 31 through 34 to join the inside of the main body part 30 are partially emitted through the exit surface 40 as the emitted light L2.

Description on Effects of Embodiment

The vehicular light guide member 3 and the vehicle lamp fitting 1 according to the present embodiment have the configurations and operations as above, and effects thereof are described below.

In the vehicular light guide member 3 and the vehicle lamp fitting 1 according to the present embodiment, some of the multiple specular surfaces 41 constitute the displaced section 44, which is so formed as to be displaced to a position closer to the exit surface 40 with respect to the reference section 43 constituted of the remains of the multiple specular surfaces 41. In other words, in the vehicular light guide member 3 and the vehicle lamp fitting 1 according to the present embodiment, the specular surfaces 41 of the displaced section 44 are displaced to positions closer to the exit surface 40 with respect to the specular surfaces 410 in the state before being displaced, as illustrated in FIGS. 10 and 11.

Figure 11:
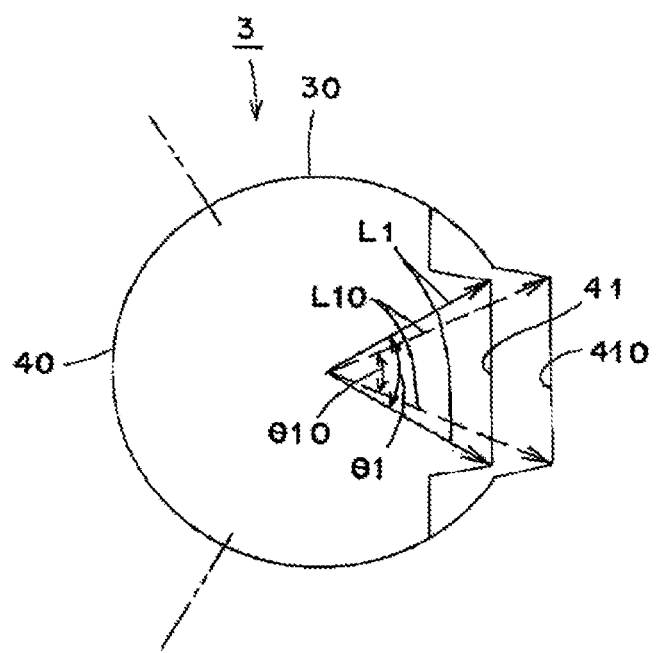
FIG. 11 is an enlarged cross-sectional diagram (enlarged cross-sectional diagram taken along a line XI-XI in FIG. 7) illustrating the optical path on the specular surfaces of the displaced section and the optical path on the specular surfaces, in which the present invention is not embodied.

As a result, in the vehicular light guide member 3 and the vehicle lamp fitting 1 according to the present embodiment, the specular surfaces 41 of the displaced section 44 receive the internal light L1 in positions closer to the exit surface 40 as illustrated in FIG. 11, so that the amount (a central angle $\theta 1$ in FIG. 11) of the internal light L1 striking (coming incident on) the specular surfaces 41 of the displaced section 44 is increased (made large) as compared with the amount (a central angle $\theta 10$ in FIG. 11) of internal light L10 striking (coming incident on) the specular surfaces 410 in the state before being displaced.

In the vehicular light guide member 3 and the vehicle lamp fitting 1 according to the present embodiment, the specular surfaces 41 of the displaced section 44 shift toward the upstream side in the light guiding direction B to receive and reflect, as the reflected light L3, the internal light L1 as illustrated in FIG. 10, so that the reflected light L3 is increased on the upstream side in the light guiding direction B as compared with the reflected light L30, which is the internal light L10 as reflected by the specular surfaces 410 in the state before being displaced.

Consequently, in the vehicular light guide member 3 and the vehicle lamp fitting 1 according to the present embodiment, the reflected light L3 as increased is directed toward a portion with a small luminance value of the exit surface 40 so as to cause the exit surface 40 of the vehicular light guide member 3 and the lamp lens 11 of the vehicle lamp fitting 1 to uniformly radiate. It should be noted that the specular surfaces 410 in the state before being displaced refer to the specular surfaces 410, in which the present invention is not embodied, that is to say, the specular surfaces 410, which have not been displaced. In FIGS. 10 and 11, a reference sign "420" is given to a linkage surface linking a specular surface 410 to another specular surface 410.

In the vehicular light guide member 3 and the vehicle lamp fitting 1 according to the present embodiment, the displaced section 44 is provided on the downstream side in the light guiding direction B of the light entrance parts 31 through 34. As a result, in the vehicular light guide member 3 and the vehicle lamp fitting 1 according to the present embodiment, the internal light L1 is reflected efficiently and in a large amount in the dark portion generated on the downstream side in the light guiding direction B of the light entrance parts 31 through 34 in the main body part 30. Consequently, in the vehicular light guide member 3 and the vehicle lamp fitting 1 according to the present embodiment, the exit surface 40 of the vehicular light guide member 3 and the lamp lens 11 of the vehicle lamp fitting 1 radiate more uniformly.

In the vehicular light guide member 3 and the vehicle lamp fitting 1 according to the present embodiment, the displaced sections 44 in the first, second, and third dark portion generation areas A1, A2, and A3 each have the form of displacement, which gradually changes so that displacement may be increased from the upstream side toward the downstream side in the light guiding direction B. As a result, in the vehicular light guide member 3 and the vehicle lamp fitting 1 according to the present embodiment, the internal light L1 and the reflected light L3 are increased in quantity of light on the downstream side in the light guiding direction B where the internal light L1 and the reflected light L3 are to be reduced in quantity of light. Consequently, in the vehicular light guide member 3 and the vehicle lamp fitting 1 according to the present embodiment, the exit surface 40 of the vehicular light guide member 3 and the lamp lens 11 of the vehicle lamp fitting 1 uniformly radiate in a more certain manner.

In the vehicular light guide member 3 and the vehicle lamp fitting 1 according to the present embodiment, the displaced section 44 in the fourth dark portion generation area A4 has the form of displacement, which gradually changes so that displacement may be great on the midstream side in the light guiding direction B and may be reduced toward the upstream side in the light guiding direction B and toward the downstream side in the light guiding direction B. As a result, in the vehicular light guide member 3 and the vehicle lamp fitting 1 according to the present embodiment, the step surface 45 between the downstream side of the displaced section 44 and the upstream side of the reference section 43 (or a step surface between an upstream side of the displaced section 44 and a downstream side of the reference section 43) is reduced in size so as to allow a die to be removed, in the case where the step surface 45 between the downstream side of the displaced section 44 and the upstream side of the reference section 43 (or the step surface between the upstream side of the displaced section 44 and the downstream side of the reference section 43) may be increased in size and the die may not be able to be removed depending on a relative relationship between the main body part 30 and the fourth light entrance part 34.

Description on Other Examples than Examples in Embodiment

In the above embodiment, description is made on an example where the vehicular light guide member 3 and the vehicle lamp fitting 1 are used for a front turn signal lamp. In the present invention, however, the vehicular light guide member 3 and the vehicle lamp fitting 1 may be used for a lamp other than the front turn signal lamp.

In the above embodiment, description is made on an example where the five light sources 21 through 25 are turned on and off according to the sequence control by the controller. In the present invention, however, multiple light sources may be turned on and off according to other turning on and off control than the sequence control.

In the above embodiment, description is made on an example where the four light entrance parts 31 through 34 are provided. In the present invention, however, a single light entrance part may be provided. In that case, at least one light source is required. In other words, a light source for causing light to enter into the main body part 30 (the fifth light source 25 in the above embodiment) is not necessarily required.

In the above embodiment, description is made on an example where the displaced section 44 is so formed as to be displaced to a position closer to the exit surface 40 with respect to the reference section 43. In the present invention, however, a displaced section may be so formed as to be displaced to a position farther from the exit surface 40 with respect to the reference section 43. In that case, specular surfaces of the displaced section decrease reflected light as compared with reflected light from specular surfaces in a state before being displaced, so as to direct the reflected light as decreased toward a portion with a large luminance value (spotlighted portion) of the exit surface 40. Consequently, the exit surface 40 uniformly radiates.

In the above embodiment, description is made on an example where the multiple specular surfaces 41 and the multiple linkage surfaces 42 having the draft are provided at one side face (the side face, on which the light entrance parts 31 through 34 are provided) of the main body part 30. In the present invention, however, surfaces parallel to the exit surface 40 may be provided between the multiple specular surfaces 41 and the multiple linkage surfaces 42 having the draft.

It should be noted that the present invention is not limited by the above embodiment.

DESCRIPTION OF REFERENCE NUMERALS 1 vehicle lamp fitting
10 lamp housing
11 lamp lens
12 lamp chamber
21, 22, 23, 24, 25 light source
3 vehicular light guide member
30 main body part
300 incidence surface
31, 32, 33, 34 light entrance part
310, 320, 330, 340 incidence surface 40 exit surface
41, 410 specular surface
42, 420 linkage surface
43 reference section
44 displaced section
45 step surface
A1, A2, A3, A4 dark portion generation area
B light guiding direction
B1, B2, B3, B4 incidence and join direction
H1, H2, H3 light portion generation area
L1, L10 light (internal light)
L2 emitted light
L3, L30 reflected light
P0, P0, P5, P10, P15, P20, P25, P30, P35 measurement point
T size
θ1, θ10 central angle

The invention claimed is:

1. A vehicular light guide member to guide light in one direction by a light guiding operation, comprising:
a main body part; and
at least one light entrance part provided on a side face of the main body part to cause the light to join the main body part,
the main body part having:
an exit surface provided at a side face opposite to the side face where the light entrance part is provided, and allowing part of internal light to be emitted outside as emitted light; and
a plurality of specular surfaces provided at the side face where the light entrance part is provided, facing the exit surface, and reflecting the internal light toward the exit surface as reflected light,
wherein some of the plurality of specular surfaces constitute a displaced section so formed as to be displaced to a position closer to the exit surface or a position farther from the exit surface with respect to a reference section constituted of remains of the plurality of specular surfaces,
wherein the displaced section is provided on a downstream side in a light guiding direction of the light entrance part, and
wherein the specular surfaces of the displaced section are displaced to positions closer to the exit surface, increase the reflected light as compared with the reflected light from the specular surfaces in a state before being displaced, and direct the reflected light toward a portion with a small luminance value of the exit surface.

2. A vehicle lamp fitting comprising:
a lamp housing and a lamp lens that demarcate a lamp chamber; and
a light source and the vehicular light guide member according to claim 1 that are arranged in the lamp chamber,
wherein the light source is arranged at least for the light entrance part of the vehicular light guide member, and
wherein the exit surface of the vehicular light guide member faces the lamp lens.

3. The vehicle lamp fitting according to claim 2,
wherein the light entrance part includes a plurality of light entrance parts,
wherein the light source includes light sources that are arranged for the plurality of light entrance parts, respectively, and
wherein the light sources are connected to a controller performing sequence control of turning on and off of the light sources.

4. A vehicular light guide member to guide light in one direction by a light guiding operation, comprising:
a main body part; and
at least one light entrance part provided on a side face of the main body part to cause the light to join the main body part,
the main body part having:
an exit surface provided at a side face opposite to the side face where the light entrance part is provided, and allowing part of internal light to be emitted outside as emitted light; and
a plurality of specular surfaces provided at the side face where the light entrance part is provided, facing the exit surface, and reflecting the internal light toward the exit surface as reflected light,
wherein some of the plurality of specular surfaces constitute a displaced section so formed as to be displaced to a position closer to the exit surface or a position farther from the exit surface with respect to a reference section constituted of remains of the plurality of specular surfaces, and
wherein the displaced section has a form of displacement that gradually changes so that displacement is increased from an upstream side toward a downstream side in a light guiding direction or gradually changes so that displacement is great on a midstream side in the light guiding direction and is reduced toward the upstream side in the light guiding direction and toward the downstream side in the light guiding direction.

5. The vehicular light guide member according to claim 4,
wherein the specular surfaces of the displaced section increase or decrease the reflected light as compared with the reflected light from the specular surfaces in a state before being displaced.

6. A vehicle lamp fitting comprising:
a lamp housing and a lamp lens that demarcate a lamp chamber; and
a light source and the vehicular light guide member according to claim 4 that are arranged in the lamp chamber,
wherein the light source is arranged at least for the light entrance part of the vehicular light guide member, and
wherein the exit surface of the vehicular light guide member faces the lamp lens.

7. The vehicle lamp fitting according to claim 6,
wherein the light entrance part includes a plurality of light entrance parts,
wherein the light source includes light sources that are arranged for the plurality of light entrance parts, respectively, and
wherein the light sources are connected to a controller performing sequence control of turning on and off of the light sources.

* * * * *